(12) United States Patent
Schuehmacher et al.

(10) Patent No.: US 11,634,947 B2
(45) Date of Patent: Apr. 25, 2023

(54) ELECTROMECHANICAL ACTUATOR COMPRISING A MODULE FOR FILTERING VIBRATIONS, AND CLOSURE, COVERING OR SOLAR PROTECTION SYSTEM COMPRISING SUCH AN ELECTROMECHANICAL ACTUATOR

(71) Applicant: SOMFY ACTIVITES SA, Cluses (FR)

(72) Inventors: Cyril Schuehmacher, Sallanches (FR); Yann Rouxel, Annecy (FR)

(73) Assignee: SOMFY ACTIVITES SA, Cluses (FR)

( * ) Notice: Subject to any disclaimer, the term of this patent is extended or adjusted under 35 U.S.C. 154(b) by 48 days.

(21) Appl. No.: 17/280,333

(22) PCT Filed: Sep. 25, 2019

(86) PCT No.: PCT/EP2019/075943
§ 371 (c)(1),
(2) Date: Mar. 26, 2021

(87) PCT Pub. No.: WO2020/064882
PCT Pub. Date: Apr. 2, 2020

(65) Prior Publication Data
US 2022/0034161 A1 Feb. 3, 2022

(30) Foreign Application Priority Data
Sep. 28, 2018 (FR) ...................................... 1858976

(51) Int. Cl.
*E06B 9/72* (2006.01)
*E06B 9/42* (2006.01)

(52) U.S. Cl.
CPC . *E06B 9/72* (2013.01); *E06B 9/42* (2013.01)

(58) Field of Classification Search
CPC .................................... E06B 9/72; E06B 9/42
See application file for complete search history.

(56) References Cited

U.S. PATENT DOCUMENTS 10,770,950 B2   9/2020  Lemaître et al.
2008/0257504 A1 10/2008  Marchetto et al.
(Continued)

FOREIGN PATENT DOCUMENTS

EP   2538015 A1    12/2012
JP   H06330682 A   11/1994
(Continued)

OTHER PUBLICATIONS

International Search Report and Written Opinion dated Nov. 7, 2019 in counterpart application No. PCT/EP2019/075943; w/ English machine translation (total 25 pages).

*Primary Examiner* — Beth A Stephan
(74) *Attorney, Agent, or Firm* — Seckel IP, PLLC

(57) ABSTRACT

An electromechanical actuator comprises a housing, a torque support (21) and a module for filtering vibrations (33). The torque support (21) comprises a shaft (35) extending along an axis of rotation (X) of the actuator. The module (33) is arranged inside the housing and comprises a transmission element (36), a stop (38) and first and second viscoelastic elements (39, 40). The transmission element (36) is mounted around the shaft (35) and is attached to the housing. The stop (38) is connected to the shaft (35). The first viscoelastic element (39) is arranged between the torque support (21) and a first end (36a) of the transmission element (36). The second viscoelastic element (40) is arranged between a second end (36b) of the transmission element (36) and the stop (38).

20 Claims, 6 Drawing Sheets

(56) References Cited

U.S. PATENT DOCUMENTS

2017/0241200 A1 8/2017 Feldstein
2020/0099271 A1 3/2020 Lemaitre et al.
2021/0246724 A1* 8/2021 Schuehmacher ......... F16D 3/12

FOREIGN PATENT DOCUMENTS

| JP | 3480600 B2 | 12/2003 |
|----|------------|---------|
| WO | 2007051865 A1 | 5/2007 |
| WO | 2018104488 A1 | 6/2018 |

* cited by examiner

ELECTROMECHANICAL ACTUATOR COMPRISING A MODULE FOR FILTERING VIBRATIONS, AND CLOSURE, COVERING OR SOLAR PROTECTION SYSTEM COMPRISING SUCH AN ELECTROMECHANICAL ACTUATOR

The present invention relates to an electromechanical actuator comprising a vibration filtering module, intended to be mounted inside a casing of the electromechanical actuator, and to a closure, covering or solar protection installation comprising a screen that can be wound onto a winding tube rotationally driven by such an electromechanical actuator.

In general, the present invention relates to the field of covering devices comprising a motorized drive device driving a screen to move it, between at least a first position and at least a second position.

A motorized drive device comprises an electromechanical actuator of a mobile closure, covering or solar protection element, such as a shutter, a door, a gate, a blind or any other equivalent device, referred to hereinafter as a screen.

The electromechanical actuator is intended to be mounted inside the winding tube. Furthermore, the electromechanical actuator comprises at least an electric motor and, preferentially, a reduction gearbox. The electric motor and the reduction gearbox generate vibrations, when the electromechanical actuator is set in operation, and these vibrations may be transmitted to the elements surrounding the electric motor, notably to the casing of the electromechanical actuator and to the winding tube.

Consequently, when the electromechanical actuator is set in operation and in an assembled configuration of the electromechanical actuator in the installation, the electromechanical actuator generates noise.

Document WO 2018/104488 A1 is already known and describes an electromechanical actuator for a closure, covering or solar protection installation. The electromechanical actuator comprises an electric motor, a casing, a torque support and a vibration filtering module.

The electric motor is mounted inside the casing, in an assembled configuration of the electromechanical actuator. The torque support is arranged at a first end of the casing of the electromechanical actuator, in the assembled configuration of the electromechanical actuator. The torque support comprises a shaft. The shaft extends along an axis of rotation of the electromechanical actuator. The vibration filtering module is arranged inside the casing of the electromechanical actuator.

However, this vibration filtering module has the disadvantage of making the vibration filtering member difficult to manufacture. This becomes all the more difficult if the inside diameter of the casing of the electromechanical actuator is small.

Consequently, the dimensions of the vibration filtering member, the thickness of the connections of the intermediate portion, and the complexity of the connections of the intermediate portion thereof lead to complex industrialization, resulting in a high cost and risks in terms of quality.

Furthermore, industrializing the vibration filtering member presents difficulties regarding the injection-molding of the plastics material of which it is made and notably leading to its becoming distorted along its length.

Moreover, such a structure for the vibration filtering module has a long length.

Consequently, the vibration filtering module takes up a significant amount of space inside the casing of the actuator and therefore makes the electromechanical actuator long in length.

Furthermore, the vibration filtering member is configured to be fixed, on the one hand, to the casing of the electromechanical actuator and, on the other hand, to the electric motor.

Also known is document WO 2007/051865 A1 which describes an electromechanical actuator for a closure, covering or solar protection installation. The electromechanical actuator comprises an electric motor, a casing and a torque support. The electric motor is mounted inside the casing, in an assembled configuration of the electromechanical actuator. The torque support is arranged at a first end of the casing of the electromechanical actuator, in the assembled configuration of the electromechanical actuator. The torque support comprises a shaft. The shaft extends along an axis of rotation of the electromechanical actuator. Moreover, this document WO 2007/051865 A1 describes that the torque support comprises two parts, a base piece and a rotary piece. The base and rotary pieces are configured to rotate one relative to the other, around the axis of rotation of the electromechanical actuator, so as to create a mechanical play that allows an obstacle to be detected. Elastic elements, such as, for example, a spring or a piece made of elastomer, are mounted in housings created between the base piece and the rotary piece, so as to maintain a separation between a surface of the base piece and a surface of the rotary piece, in the assembled configuration of the electromechanical actuator, whether this be before or after the electromechanical actuator has been installed in the closure, covering or solar protection installation. These elastic elements are intended to modify the obstacle detection sensitivity, so as to avoid false alarms or parasitic signals originating from sensors used for detecting obstacles. Furthermore, the parts of the base piece and rotary piece that form the housings to accommodate the elastic elements are arranged on the outside of the casing of the electromechanical actuator. The maximum extent to which the rotary piece can be pushed inside the casing of the electromechanical actuator is delimited by the end stop in the form of a flange.

It is an object of the present invention to overcome the abovementioned disadvantages and to propose an electromechanical actuator for a closure, covering or solar protection installation comprising a vibration filtering module, intended to be mounted inside a casing of the electromechanical actuator, and a closure, covering or solar protection installation comprising such an electromechanical actuator, making it possible to simplify a structure of a vibration filtering module, to reduce the length of the vibration filtering module and to ensure a reduction in a transmission of vibrations from the electromechanical actuator to the installation, while at the same time minimizing the costs of obtaining the vibration filtering module and therefore of the electromechanical actuator.

To this end, a first aspect of the present invention relates to an electromechanical actuator for a closure, covering or solar protection installation, the electromechanical actuator comprising at least:
an electric motor,
a casing, the electric motor being mounted inside the casing, in an assembled configuration of the electromechanical actuator,
a torque support, the torque support being arranged at a first end of the casing of the electromechanical actuator, in the assembled configuration of the electromechanical actuator, the torque support comprising a shaft, the shaft extending along an axis of rotation of the electromechanical actuator, a vibration filtering module, the vibration filtering module being arranged inside the casing of the electromechanical actuator, in the assembled configuration of the electromechanical actuator.

According to the invention, the vibration filtering module comprises at least:

a transmission element, the transmission element being mounted around the shaft of the torque support and being fixed to the casing by means of at least a first fixing element, in the assembled configuration of the electromechanical actuator, an end stop, the end stop being connected to the shaft of the torque support, a first viscoelastic element, the first viscoelastic element being arranged between the torque support and a first end of the transmission element, according to the direction of the axis of rotation and in the assembled configuration of the electromechanical actuator, and a second viscoelastic element, the second viscoelastic element being arranged between a second end of the transmission element and the end stop, according to the direction of the axis of rotation and in the assembled configuration of the electromechanical actuator, the second end of the transmission element being opposite to the first end of the transmission element.

Thus, such a structure of the vibration filtering module is simplified and makes it possible to ensure a reduction in a transmission of vibrations from the electromechanical actuator to the installation and, more particularly, from the casing of the electromechanical actuator to the torque support of the electromechanical actuator, while at the same time minimizing the costs of obtaining the vibration filtering module and therefore of the electromechanical actuator.

In this way, it becomes easier to industrialize such a vibration filtering module.

Moreover, the structure of the vibration filtering module makes it possible to obtain an elastic deformation of the first and second viscoelastic elements, in particular by compression, along the axis of rotation, and to obtain a swiveling between the transmission element and the shaft of the torque support, when the electromechanical actuator is set in operation.

In this way, the vibration filtering module is able to filter vibrations according to an axial direction and a radial direction of the electromechanical actuator, that is to say according to the direction of the axis of rotation and a direction orthogonal to the axis of rotation.

Fixing the transmission element to the casing of the electromechanical actuator makes it possible to ensure to take up the torque between the casing and the torque support.

Furthermore, the structure of the vibration filtering module also makes it possible to minimize the length thereof and thus obtain a vibration filtering module that is compact, so as to minimize the length of the electromechanical actuator.

According to an advantageous feature of the invention, the transmission element comprises a first housing. Moreover, the shaft of the torque support is configured to be arranged inside the first housing of the transmission element, in the assembled configuration of the electromechanical actuator.

According to another advantageous feature of the invention, the shaft of the torque support comprises at least an element in relief, notably convex or projecting. The transmission element comprises at least a recessed element extending away from the axis of rotation from an internal surface of the first housing. Moreover, the or one of the elements in relief of the shaft of the torque support is configured to cooperate with the or one of the recessed elements of the transmission element, in the assembled configuration of the electromechanical actuator, or vice versa.

According to another advantageous feature of the invention, the transmission element comprises at least a second housing.

According to an embodiment, the first viscoelastic element and the second viscoelastic element constitute a vibration filtering member and form a single piece, the vibration filtering member extending inside the second housing of the transmission element and beyond the first and second ends of the transmission element, according to the direction of the axis of rotation and in the assembled configuration of the electromechanical actuator.

According to another embodiment, the first viscoelastic element and the second viscoelastic element respectively form a distinct piece, at least one of the first and second viscoelastic elements extending partially inside the second housing of the transmission element and beyond one of the first and second ends of the transmission element, according to the direction of the axis of rotation and in the assembled configuration of the electromechanical actuator.

According to an embodiment, the end stop is fixed to the shaft of the torque support by means of at least a second fixing element, in the assembled configuration of the electromechanical actuator.

According to another advantageous feature of the invention, the end stop is made in the form of a washer.

According to another embodiment, the end stop forms an integral part of the shaft of the torque support.

According to another advantageous feature of the invention, the electromechanical actuator comprises at least a battery, the battery being arranged inside the casing, in the assembled configuration of the electromechanical actuator.

A second aspect of the present invention relates to a closure, covering or solar protection installation comprising a screen, a winding tube and an electromechanical actuator, according to the invention and as mentioned hereinabove, the screen being arranged in such a way as to be able to be wound onto the winding tube and the winding tube being arranged in such a way as to be rotationally driven by the electromechanical actuator.

This installation offers features and advantages analogous to those described hereinabove, in connection with the electromechanical actuator according to the invention.

Other specific features and advantages of the invention will become further apparent from the following description, given with reference to the attached figures, provided by way of non-limiting examples:

Figure 1:
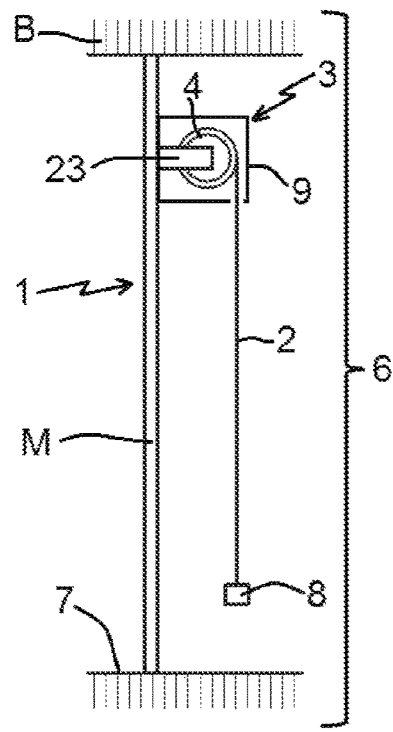
FIG. 1 is a schematic view in transverse section of an installation according to a first embodiment of the invention.
Figure 2:
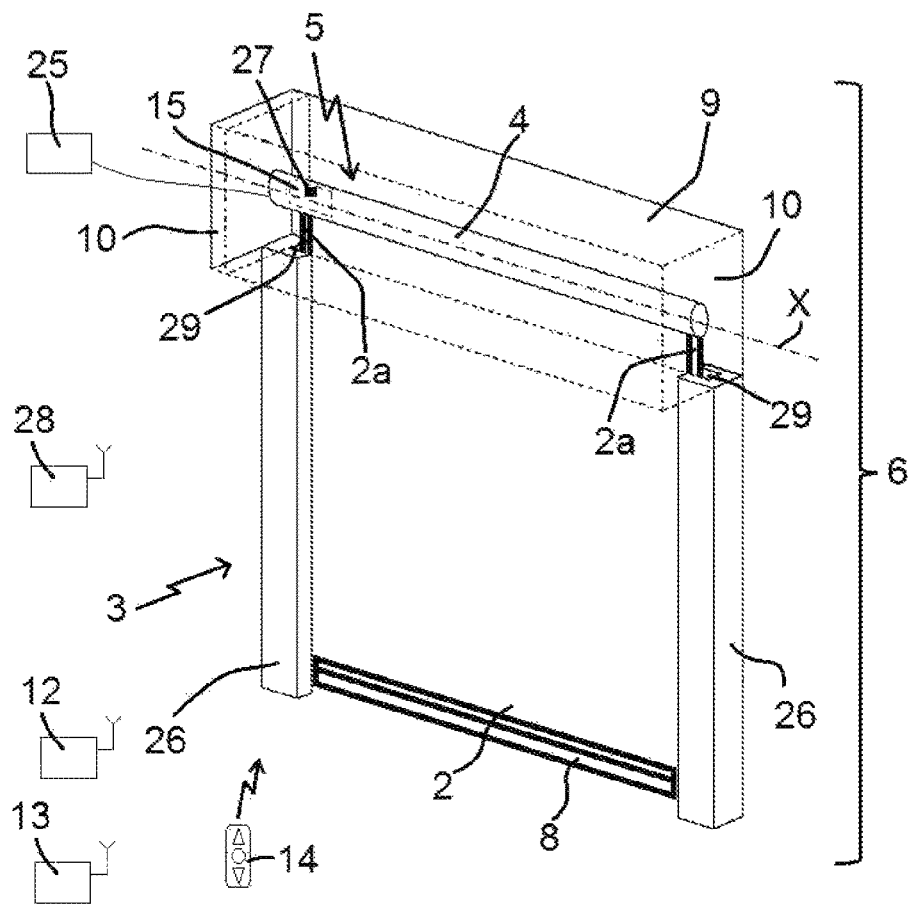
FIG. 2 is a schematic perspective view of the installation illustrated in FIG. 1.

An installation 6 according to the invention and installed in a building B comprising an opening 1, window or door, equipped with a screen 2 belonging to a closure, covering or solar protection device 3, in particular a motorized blind, is described first of all, with reference to FIGS. 1 and 2.

The closure, covering or solar protection device 3 is referred to hereinabove as "covering device". The covering device 3 comprises the screen 2.

The covering device 3 may comprise a roller blind, notably a fabric, a pleated blind or a blind with slats. The covering device 3 may also comprise a roller shutter or else a roller door. The present invention applies to all types of covering device.

A roller blind according to an embodiment of the invention is described, with reference to FIGS. 1 and 2.

The covering device 3 comprises a winding tube 4 and a motorized drive device 5. The motorized drive device 5 comprises an electromechanical actuator 11.

The screen 2 of the covering device 3 is wound onto the winding tube 4 driven by the motorized drive device 5. Thus, the screen 2 is mobile between a rolled-up position, in particular an up position, and an unrolled position, in particular a down position.

The screen 2 of the covering device 3 is a closure, covering and/or solar protection screen, which can be rolled up onto and unrolled around the winding tube 4, the inside diameter of which is substantially greater than the outside diameter of the electromechanical actuator 11, so that the electromechanical actuator 11 can be inserted into the winding tube 4, during the assembly of the covering device 3.

Advantageously, the covering device 3 comprises a retaining device 9, 23.

Advantageously, the retaining device 9, 23 may comprise two supports 23. A support 23 is arranged at each end of the winding tube 4, in an assembled configuration of the covering device 3.

Thus, the winding tube 4 is held by the supports 23. Just one of the supports 23 is shown in FIG. 1. The supports 23 allow the covering device 3 to be connected mechanically to the structure of the building B, notably to a wall M of the building B.

Advantageously, the retaining device 9, 23 may comprise a box 9. Moreover, the winding tube 4 and at least a part of the screen 2 are housed inside the box 9, in the assembled configuration of the covering device 3.

In general, the box 9 is arranged above the opening 1, or else in an upper part of the opening 1.

Here and as illustrated in FIG. 1, the supports 23 are also housed inside the box 9.

In a variant, shown in FIG. 2, the winding tube 4 is held by the box 9, in particular by means of the end faces 10 of the box 9.

Advantageously, the covering device 3 may also comprise two lateral slideways 26, as illustrated in FIG. 2. Each lateral slideway 26 comprises a groove 29. Each groove 29 in one of the lateral slideways 26 cooperates, in other words is configured to cooperate, with a lateral edge 2a of the screen 2, in the assembled configuration of the covering device 3, so as to guide the screen 2, when the screen 2 is rolled up and unrolled around the winding tube 4.

The electromechanical actuator 11 is, for example, of tubular type. This allows the winding tube 4 to be rotated about an axis of rotation X, in such a way as to unroll or roll up the screen 2 of the covering device 3.

Thus, the screen 2 can be rolled up or unrolled around the winding tube 4. In the mounted state, the electromechanical actuator 11 is inserted inside the winding tube 4.

Advantageously, the covering device 3 also comprises a loading bar 8 to apply tension to the screen 2.

The roller blind, which forms the covering device 3, comprises a fabric, forming the screen 2 of the roller blind 3. A first end of the screen 2, in particular the upper end of the screen 2, in the assembled configuration of the covering device 3, is fixed to the winding tube 4. Moreover, a second end of the screen 2, in particular the lower end of the screen 2, in the assembled configuration of the covering device 3, is fixed to the loading bar 8.

Here, the fabric forming the screen 2 is made from a textile material.

In an exemplary embodiment, not shown, the first end of the screen 2 has a hem through which a rod, in particular in plastic material, is arranged. This hem made at the first end of the screen 2 is obtained by means of a seam of the fabric forming the screen 2. During the assembly of the screen 2 on the winding tube 4, the hem and the rod which are situated at the first end of the screen 2 are slid into a slot made on the external face of the winding tube 4, in particular along the entire length of the winding tube 4, so as to attach the screen 2 to the winding tube 4 and to allow the screen 2 to be rolled up and unrolled around the winding tube 4.

In the case of a roller blind, the upper rolled-up position corresponds to a predetermined upper end-of-travel position, or else to the bearing of the loading bar 8 of the screen 2 against an edge of the box 9 of the roller blind 3, and the lower unrolled position corresponds to a predetermined lower end-of-travel position or to the bearing of the loading bar 8 of the screen 2 against a threshold 7 of the opening 1, or else to the screen 2 being completely unrolled.

Advantageously, the motorized drive device 5 is controlled by a command unit. The command unit may, for example, be a local command unit 12 or a central command unit 13.

Advantageously, the local command unit 12 may be connected by a wired or wireless connection to the central command unit 13.

Advantageously, the central command unit 13 may operate the local command unit 12, as well as other local command units similar and distributed through the building.

Advantageously, the central command unit 13 may be in communication with a weather station situated inside the building B or arranged outside the building B, including, notably, one or more sensors that can be configured to determine, for example, a temperature, a brightness or else a wind speed, in the case where the weather station is arranged outside the building B.

A remote control 14, which may be of a type of local command unit, and provided with a control keypad, which comprises selection and display elements, allows, in addition, a user to act upon the electromechanical actuator 11 and/or the central command unit 13.

The motorized drive device 5 is, preferably, configured to execute the commands to unroll or to roll up the screen 2 of the covering device 3, which commands may, notably, be emitted by the local command unit 12, the central command unit 13 or the remote control 14.

Figure 3:
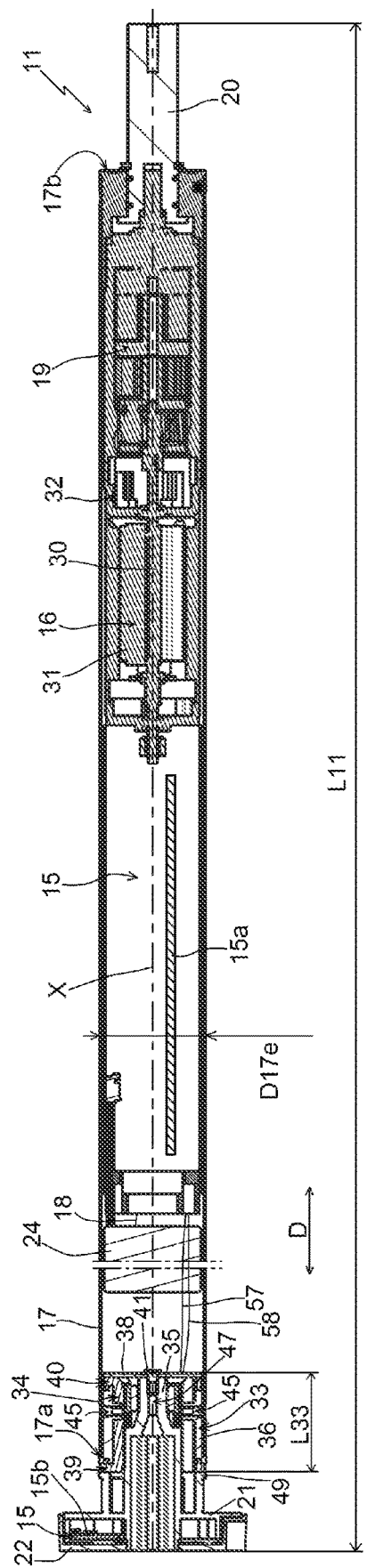
FIG. 3 is a schematic view in section of an electromechanical actuator of the installation illustrated in FIGS. 1 and 2, according to the first embodiment.

The electromechanical actuator 11 belonging to the installation 6 of FIGS. 1 and 2 is now described, in greater details and with reference to FIG. 3.

The electromechanical actuator 11 comprises an electric motor 16. The electric motor 16 comprises a rotor 31 and a stator 30, which are positioned coaxially around the axis of rotation X, which is also the axis of rotation of the winding tube 4 in the mounted configuration of the motorized drive device 5.

Control means of the electromechanical actuator 11, allowing the screen 2 of the covering device 3 to be moved, comprise at least an electronic control unit 15. This electronic control unit 15 is able to set in operation the electric motor 16 of the electromechanical actuator 11 and, in particular, to apply electrical power to the electric motor 16.

Thus, the electronic control unit 15, notably, controls the electric motor 16, in such a way as to open or close the screen 2, as described hereinabove.

Advantageously, the electronic control unit 15 also comprises a communication module 27, as illustrated in FIG. 2, in particular for receiving command orders, the command orders being emitted by a command order emitter, such as the remote control 14 intended to control the electromechanical actuator 11 or one of the local 12 or central 13 command units.

Preferentially, the communication module 27 of the electronic control unit 15 is of a wireless type. In particular, the communication module 27 is configured to receive radio-electric command orders.

The communication module 27 may also allow the receipt of command orders transmitted by wired means.

The central command unit 13, the local command unit 12 or the electronic control unit 15 may also be in communication with a server 28, as illustrated in FIG. 2, so as to control the electromechanical actuator 11 on the basis of data made available remotely by means of a communication network, in particular an internet network which may be connected to the server 28.

The control means of the electromechanical actuator 11 comprise hardware means and/or software means.

By way of non-limiting example, the hardware means may comprise at least a microcontroller.

Advantageously, the electromechanical actuator 11 is supplied with electrical power by at least a battery 24.

Here, the electromechanical actuator 11 comprises an electrical power supply cable 18 allowing it to be supplied with electrical energy, in particular from the battery 24.

Advantageously, the battery 24 is of rechargeable type and supplies the electromechanical actuator 11 with electrical energy.

Advantageously, the battery 24 comprises one or more energy storage elements, not shown. The energy storage elements of the battery 24 may, notably, be rechargeable accumulators or else rechargeable cells.

Advantageously, the motorized drive device 5 and, in particular, the electronic control unit 15, comprises charging elements configured to charge the battery 24 from electrical energy supplied by an external electrical power supply 25, as illustrated in FIG. 2.

By way of non-limiting example, the external electrical power supply 25 is a charger that can be plugged into an electrical wall outlet, so as to recharge the battery 24 from a mains electricity supply network.

In a variant, not shown, the external electrical power supply 25 is an auxiliary battery, so as to recharge the battery 24.

Thus, the battery 24 can be recharged by means of the auxiliary battery forming the external electrical power supply 25, in particular in the case where the covering device 3 is remote from an electric wall outlet.

Advantageously, the electronic control unit 15 comprises a first electronic board 15a and a second electronic board 15b.

Advantageously, the first electronic board 15a is configured to control the electric motor 16. Moreover, the second electronic board 15b is configured, notably, to allow the battery 24 to be recharged, using an electrical connector, not shown, and, eventually, to access functions for setting up and/or configuring the electromechanical actuator 11, using selection elements and, eventually, display elements, not shown.

Here and non-limitingly, the charging elements are arranged on the second electronic board 15b.

In a variant, not shown, the electromechanical actuator 11 is powered with electrical energy by a mains electricity supply network.

The electromechanical actuator 11 comprises a casing 17, in particular tubular. The electric motor 16 is mounted inside the casing 17, in an assembled configuration of the electromechanical actuator 11.

Here, the casing 17 of the electromechanical actuator 11 is cylindrical in shape, notably of revolution.

In an exemplary embodiment, the casing 17 is made from a metallic material.

The material of the casing of the electromechanical actuator is non-limiting and may be different. It may, in particular, be a plastic material.

Advantageously, the battery 24 is arranged inside the casing 17 of the electromechanical actuator 11, in the assembled configuration of the electromechanical actuator 11.

Advantageously, the electromechanical actuator 11 also comprises a reduction gearbox 19 and an output shaft 20.

Advantageously, the reduction gearbox 19 comprises at least a reduction stage. The reduction stage may be a gearset of epicyclic type.

The type and number of reduction stages of the reduction gearbox are non-limiting.

Advantageously, the electromechanical actuator 11 also comprises a brake 32.

By way of non-limiting examples, the brake 32 may be a spring brake, a cam brake or an electromagnetic brake.

Advantageously, the reduction gearbox 19 and, eventually, the brake 32, are arranged inside the casing 17 of the electromechanical actuator 11, in the assembled configuration of the electromechanical actuator 11.

Advantageously, the electromechanical actuator 11 may also comprise an end-of-travel and/or obstacle detection device, which may be mechanical or electronic.

The winding tube 4 is driven in rotation around the axis of rotation X and the casing 17 of the electromechanical actuator 11 being supported by two pivot connections. The first pivot connection is made at a first end of the winding tube 4 by means of a ring, not shown, inserted around a first end 17a of the casing 17 of the electromechanical actuator 11. The ring is thus able to made a bearing. The second pivot connection, not shown, is made at a second end of the winding tube 4.

Advantageously, the electromechanical actuator 11 comprises a torque support 21, which may also called actuator head 21. The torque support 21 is arranged at the first end 17a of the casing 17 of the electromechanical actuator 11, in the assembled configuration of the electromechanical actuator 11. The torque support 21 allows to take up the loads applied by the electromechanical actuator 11 and to ensure the taking up of the loads exerted by the electromechanical actuator 11, in particular the torque exerted by the electromechanical actuator 11, by the structure of the building B. The torque support 21 advantageously, in addition, allows to take up the loads applied by the winding tube 4, notably the weight of the winding tube 4, of the electromechanical actuator 11 and of the screen 2, and to ensuring the taking up of these loads by the structure of the building B.

Thus, the torque support 21 of the electromechanical actuator 11 allows the electromechanical actuator 11 to be fixed to the retaining device 9, 23, in particular to one of the supports 23 or to one of the end faces 10 of the box 9.

Advantageously, the torque support 21 projects at the first end 17a of the casing 17 of the electromechanical actuator 11, in particular the end 17a of the casing 17 that has the ring. The ring constitutes, in other words is configured to constitute, a bearing guiding the rotation of the winding tube 4, in the assembled configuration of the covering device 3.

Advantageously, the torque support 21 of the electromechanical actuator 11 may also be able to close off the first end 17a of the casing 17.

Furthermore, the torque support 21 of the electromechanical actuator 11 may make it possible to support at least a part of the electronic control unit 15.

The torque support 21 comprises a shaft 35. The shaft 35 of the torque support 21 extends along the axis of rotation X.

Advantageously, the electronic control unit 15 may be supplied with electrical energy by means of the electrical power supply cable 18.

Advantageously, the electronic control unit 15 may be arranged at least in part inside the casing 17 of the electromechanical actuator 11.

Furthermore, the electronic control unit 15 may be arranged at least in part outside the casing 17 of the electromechanical actuator 11 and, in particular, mounted on one of the two supports 23, on one of the end faces 10 of the box 9 or in the torque support 21.

Here, the first electronic board 15a of the electronic control unit 15 is arranged inside the casing 17 of the electromechanical actuator 11. Moreover, the second electronic board 15b is arranged inside the torque support 21 of the electromechanical actuator 11.

Here and as illustrated in FIG. 3, the torque support 21 comprises a cover 22. Moreover, the second electronic board 15b is arranged inside a housing formed between the torque support 21 and the cover 22.

Advantageously, the torque support 21 comprises at least a button, not shown.

This or these buttons may make it possible to set the electromechanical actuator 11 using one or more configuration modes, to pair one or more command units 12, 13, 14, to reset one or more parameters which may, for example, be an end-of-travel position, to reset the paired command unit or units 12, 13, 14 or else to control the movement of the screen 2.

Here, the torque support 21 comprises a single button.

The number of buttons of the torque support is non-limiting and may be different. It may, notably, be greater than or equal to two.

Advantageously, the torque support 21 comprises at least a lighting device, not shown, so as to be able to provide a visual indication, which may, for example, be a state of charge of the battery 24.

Advantageously, the lighting device comprises at least a lighting source, not shown, in particular a light emitting diode, mounted on the second electronic board 15b and, eventually, a transparent or translucent cap and/or a light guide, to allow the light emitted by the lighting source to pass.

Here, the torque support 21 comprises a single lighting device.

The number of lighting devices is non-limiting and may be different. It may, notably, be greater than or equal to two.

Advantageously, the output shaft 20 of the electromechanical actuator 11 is arranged inside the winding tube 4 and at least in part on the outside of the casing 17 of the electromechanical actuator 11.

Here, an end of the output shaft 20 projects with respect to the casing 17 of the electromechanical actuator 11, in particular with respect to a second end 17b of the casing 17 opposite to the first end 17a.

Advantageously, the output shaft 20 of the electromechanical actuator 11 is configured to drive in rotation a connecting element, not shown, connected to the winding tube 4. The connecting element is made in the form of a wheel.

When the electromechanical actuator 11 is set in operation, the electric motor 16 and the reduction gearbox 19 drive in rotation of the output shaft 20. Moreover, the output shaft 20 of the electromechanical actuator 11 drives in rotation the winding tube 4 by means of the connecting element.

Thus, the winding tube 4 drives in rotation the screen 2 of the covering device 3, so as to open or close the opening 1.

The electromechanical actuator 11 comprises a vibration filtering module 33. Moreover, the vibration filtering module 33 is arranged inside the casing 17 of the electromechanical actuator 11, in the assembled configuration of the electromechanical actuator 11.

The vibration filtering module 33 of the electromechanical actuator 11, illustrated in FIG. 3, according to the first embodiment of the invention, is now described, with reference to FIGS. 4 to 8 and 12.

The vibration filtering module 33 comprises a transmission element 36, an end stop 38, a first viscoelastic element 39 and a second viscoelastic element 40.

The transmission element 36 is mounted around the shaft 35 of the torque support 21 and is fixed to the casing 17 of the electromechanical actuator 11 by means of at least a first fixing element 37, in the assembled configuration of the electromechanical actuator 11.

Thus, the transmission element 36 is blocked in translation inside the casing 17 of the electromechanical actuator 11 and, more particularly, with respect to the casing 17.

In this way, the transmission element 36 is rigidly connected to the casing 17 of the electromechanical actuator 11, according to the direction of the axis of rotation X.

The end stop 38 is connected to the shaft 35 of the torque support 21, notably the end stop 38 is fixed to the shaft 35 of the torque support 21, that is to say that the end stop 38 and the shaft 35 are as one with one another, in the assembled configuration of the electromechanical actuator 11, and may be in connection with embedding or in complete connection.

The first viscoelastic element 39 is arranged between the torque support 21 and a first end 36a of the transmission element 36, according to the direction of the axis of rotation X and in the assembled configuration of the electromechanical actuator 11.

The second viscoelastic element 40 is arranged between a second end 36b of the transmission element 36 and the end stop 38, according to the direction of the axis of rotation X and in the assembled configuration of the electromechanical actuator 11. The second end 36b of the transmission element 36 is opposite to the first end 36a of the transmission element 36.

Thus, such a structure for the vibration filtering module 33 is simplified, in particular in relation to the prior art known from document WO 2018/104488 A1, and makes it possible to ensure a reduction in a transmission of vibrations from the electromechanical actuator 11 toward the installation 6 and, more particularly, from the casing 17 of the electromechanical actuator 11 toward the torque support 21 of the electromechanical actuator 11, while at the same time minimizing the costs of obtaining the vibration filtering module 33 and therefore of the electromechanical actuator 11.

In this way, such a vibration filtering module 33 becomes easier to industrialize.

Moreover, the structure of the vibration filtering module 33 makes it possible to obtain an elastic deformation of the first and second viscoelastic elements 39, 40, in particular by compression, along the axis of rotation X, and to obtain a swiveling between the transmission element 36 and the shaft 35 of the torque support 21, when the electromechanical actuator 11 is set in operation.

In this way, the vibration filtering module 33 is able to filter vibrations according to an axial direction and a radial direction of the electromechanical actuator 11, that is to say according to the direction of the axis of rotation X and a direction orthogonal to the axis of rotation X.

Fixing the transmission element 36 to the casing 17 of the electromechanical actuator 11 makes it possible to ensure to take up the torque between the casing 17 and the torque support 21.

Such a vibration filtering module 33 thus allows a translational movement of the casing 17 of the electromechanical actuator 11 with respect to the torque support 21 of the electromechanical actuator 11, according to the direction of the axis of rotation X, by means of a slideway connection between the transmission element 36 and the shaft 35 of the torque support 21, and a swiveling between the transmission element 36 and the shaft 35 of the torque support 21, by means of the first and second viscoelastic elements 39, 40.

The translational movement of the casing 17 with respect to the torque support 21, according to the direction of the axis of rotation X, is limited by a thickness e39, e40 of each of the first and second viscoelastic elements 39, 40 and, more particularly, by the compression of the first and second viscoelastic elements 39, 40, according to the direction of the axis of rotation X.

The swiveling movement between the transmission element 36 and the shaft 35 of the torque support 21 is limited by the thickness e39, e40 of each of the first and second viscoelastic elements 39, 40, by a span P of the slideway connection between the transmission element 36 and the shaft 35 of the torque support 21 and by an assembly play J between the transmission element 36 and the shaft 35 of the torque support 21. More particularly, the swiveling movement between the transmission element 36 and the shaft 35 of the torque support 21 is limited by the compression of the first and second viscoelastic elements 39, 40, between an internal surface 53a of one or each second housing 53 of the transmission element 36 and an external surface 35a of the shaft 35 of the torque support 21.

The span P defines a length of an area of contact between the transmission element 36 and the shaft 35 of the torque support 21, in the assembled configuration of the electromechanical actuator 11. Here, the span P of the slideway connection between the transmission element 36 and the shaft 35 of the torque support 21 is said to be short and may be of a length that may, for example, be comprised between 0.1 time and 1 time the diameter of the shaft 35 of the torque support 21 at the level of the area of contact between the transmission element 36 and the shaft 35 of the torque support 21.

The assembly play J may have a value which may, for example, be comprised in a range of values from 0.1 millimeter to 0.6 millimeter.

Furthermore, the structure of the vibration filtering module 33 also makes it possible to minimize the length L33 thereof and thus obtain a vibration filtering module 33 that is compact, so as to minimize the length L11 of the electromechanical actuator 11.

Advantageously, the length L33 of the vibration filtering module 33 is determined in such a way as to optimize the filtration of vibrations.

Such a vibration filtering module 33 is particularly well suited to electromechanical actuators comprising a casing of small diameter D17e, in particular outside diameter, which may, for example, be of the order of 20 millimeters to 60 millimeters and, preferentially, of the order of 25 millimeters to 30 millimeters.

Advantageously, the vibration filtering is performed by elastic deformation of the first and second viscoelastic elements 39, 40, when the electromechanical actuator 11 is set in operation, that is to say when the electric motor 16 of the electromechanical actuator 11 is activated.

Advantageously, the transmission element 36 is made from a plastic material. This may, for example, be a polyacetal, notably a polyoxymethylene, abbreviated to POM.

Advantageously, the first and second viscoelastic elements 39, 40 are made from an elastomer. This may, for example, be a thermoplastic elastomer, abbreviated to TPE, notably of polyurethane, abbreviated to TPE-U, or vulcanized olefin, abbreviated to TPE-V.

Advantageously, the first and second viscoelastic elements 39, 40 have a Shore A hardness that may, for example, be comprised in a range of values from 40 to 100.

Here, the vibration filtering module 33 is mounted wholly inside the casing 17 of the electromechanical actuator 11, in the assembled configuration of the electromechanical actuator 11.

Here, in the assembled configuration of the electromechanical actuator 11, the transmission element 36 is fixed to the casing 17 of the electromechanical actuator 11 by means of two first fixing elements 37, arranged at an angle of 180° to each other, around the axis of rotation X.

Advantageously, in the assembled configuration of the electromechanical actuator 11, the end stop 38 is fixed to the shaft 35 of the torque support 21 by means of at least a second fixing element 41, in particular a single second fixing element 41 arranged according to the direction of the axis of rotation X and, more specifically, aligned with the axis of rotation X.

Thus, the vibration filtering module 33 is assembled on the side of the first end 17a of the casing 17 of the electromechanical actuator 11, at which end the torque support 21 is assembled.

Here, the first fixing elements 37 and the second fixing element 41 are fixing screws. For example, each fixing screw forming one of the first fixing elements 37 passes through a passage hole, not shown, arranged in the casing 17 and cooperates with a fixing hole 45, in particular a tapped hole, in the transmission element 36, in the assembled configuration of the electromechanical actuator 11.

The type and number of first and second fixing elements are non-limiting. These fixing elements may, notably, be rivets. These fixing elements may, for example, be one, two or more.

Here and as illustrated in FIG. 3, the vibration filtering module 33 is arranged between the torque support 21 and the electric motor 16 and, more particularly, between the torque support 21 and the battery 24.

Advantageously, the transmission element 36 comprises a first housing 42. Moreover, the shaft 35 of the torque support 21 is arranged, in other words configured to be arranged, inside the first housing 42 of the transmission element 36, in the assembled configuration of the electromechanical actuator 11.

Thus, the shaft 35 of the torque support 21 is housed inside the first housing 42 of the transmission element 36, in the assembled configuration of the electromechanical actuator 11.

In this way, the transmission element 36 is held on the torque support 21 by nesting together, in the assembled configuration of the electromechanical actuator 11.

Advantageously, the shaft 35 of the torque support 21 comprises at least a element in relief 43. By "element in relief" is meant, preferably, throughout this document, an element in relief that is convex or protruding. The transmission element 36 comprises at least a recessed element 44 extending away from the axis of rotation X from an internal surface 42a of the first housing 42, in other words extending toward an external surface 36c of the transmission element 36. Moreover, the or one of the elements in relief 43 of the shaft 35 of the torque support 21 cooperates, in other words is configured to cooperate, with the or one of the recessed elements 44 of the transmission element 36, in the assembled configuration of the electromechanical actuator 11.

The element or elements in relief 43 of the shaft 35 of the torque support 21 may also be called ribs or teeth.

The recessed element or elements 44 of the transmission element 36 may also be called slots, grooves or housings.

Here, the shaft 35 of the torque support 21 comprises three elements in relief 43 arranged at an angle of 120° relative to each other, around the axis of rotation X. Moreover, the transmission element 36 comprises three recessed elements 44, arranged at angle of 120° relative to each other, around the axis of rotation X.

The number and angular position of the elements in relief and of the recessed elements are non-limiting and may be different. The elements in relief and the recessed elements may be one or more and, for example, two and arranged at an angle of 180° relative to each other, around the axis of rotation.

Thus, the or each element in relief 43 of the shaft 35 of the torque support 21 is housed inside the or one of the recessed elements 44 of the transmission element 36, in the assembled configuration of the electromechanical actuator 11.

In this way, the transmission element 36 is blocked in rotation with respect to the torque support 21, in the assembled configuration of the electromechanical actuator 11.

Consequently, the blocking in rotation of the transmission element 36 with respect to the torque support 21 allows to implement a recovery of couple, when the electromechanical actuator 11 is set in operation.

Advantageously, the or one of the recessed elements 44 of the transmission element 36 cooperates, in other words is configured to cooperate, with the or one of the elements in relief 43 of the shaft 35 of the torque support 21, in the assembled configuration of the electromechanical actuator 11, so as to block in rotation the transmission element 36 with respect to the torque support 21, whereas the transmission element 36 is engaged, in other words is configured to be engaged, on the shaft 35 of the torque support 21 by an axial sliding D, along the axis of rotation X, in the assembled configuration of the electromechanical actuator 11.

Thus, the transmission element 36 is in mesh with the torque support 21, in the assembled configuration of the electromechanical actuator 11. Cooperation between the recessed element or elements 44 of the transmission element 36 and the element or elements in relief 43 of the shaft 35 of the torque support 21 allows the transmission element 36 to be engaged on the shaft 35 of the torque support 21, by axial sliding D, while at the same time ensuring that relative rotation between the transmission element 36 and the torque support 21, around the axis of rotation X, is blocked.

In a variant, not shown, the layout of the element or elements in relief 43 and of the recessed element or elements 44 at the shaft 35 of the torque support 21 and at the transmission element 36 can be reversed.

Advantageously, the element or elements in relief 43 of the shaft 35 of the torque support 21 comprise a first lateral wall 43a, a second lateral wall 43b and a top wall 43c.

Figure 12:
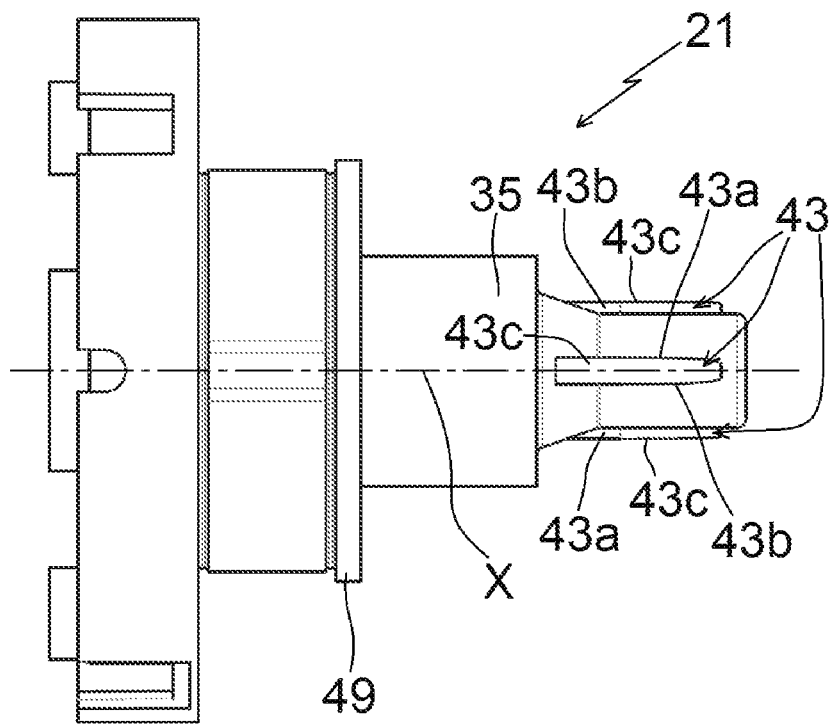
FIG. 12 is a schematic view from above of a shaft of a torque support of the electromechanical actuator illustrated in FIG. 3, according to one of the first and second embodiments of the invention.

Moreover, the first and second lateral walls 43a, 43b of each element in relief 43 have a concave shape, according to the direction of the axis of rotation X, that is to say have a rounded shape toward the outside of each element in relief 43, as illustrated in FIG. 12.

Thus, the concavity of the first and second lateral walls 43a, 43b of each element in relief 43 makes it possible to increase the swiveling movement between the transmission element 36 and the shaft 35 of the torque support 21, while at the same time maintaining a small operating play between the or each element in relief 43 of the shaft 35 of the torque support 21 and the or one of the recessed elements 44 of the transmission element 36.

Figure 6:
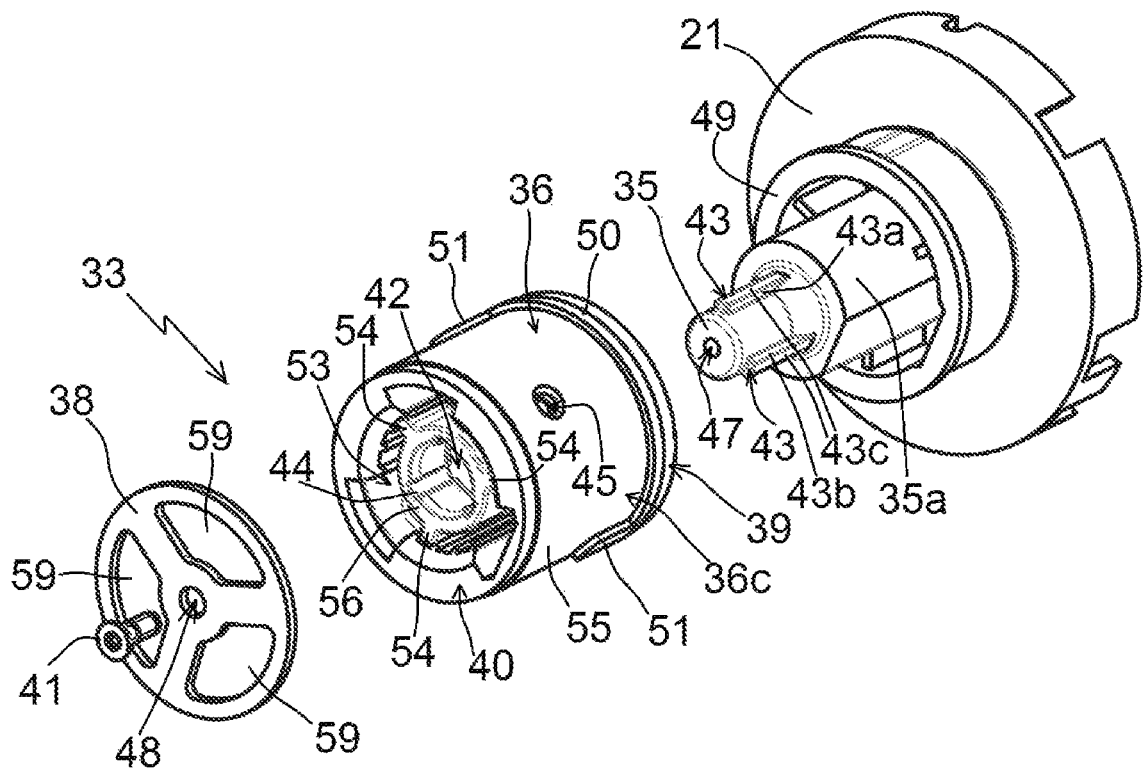
FIG. 6 is a schematic exploded and perspective view of the part of the electromechanical actuator illustrated in FIG. 4.
Figure 11:
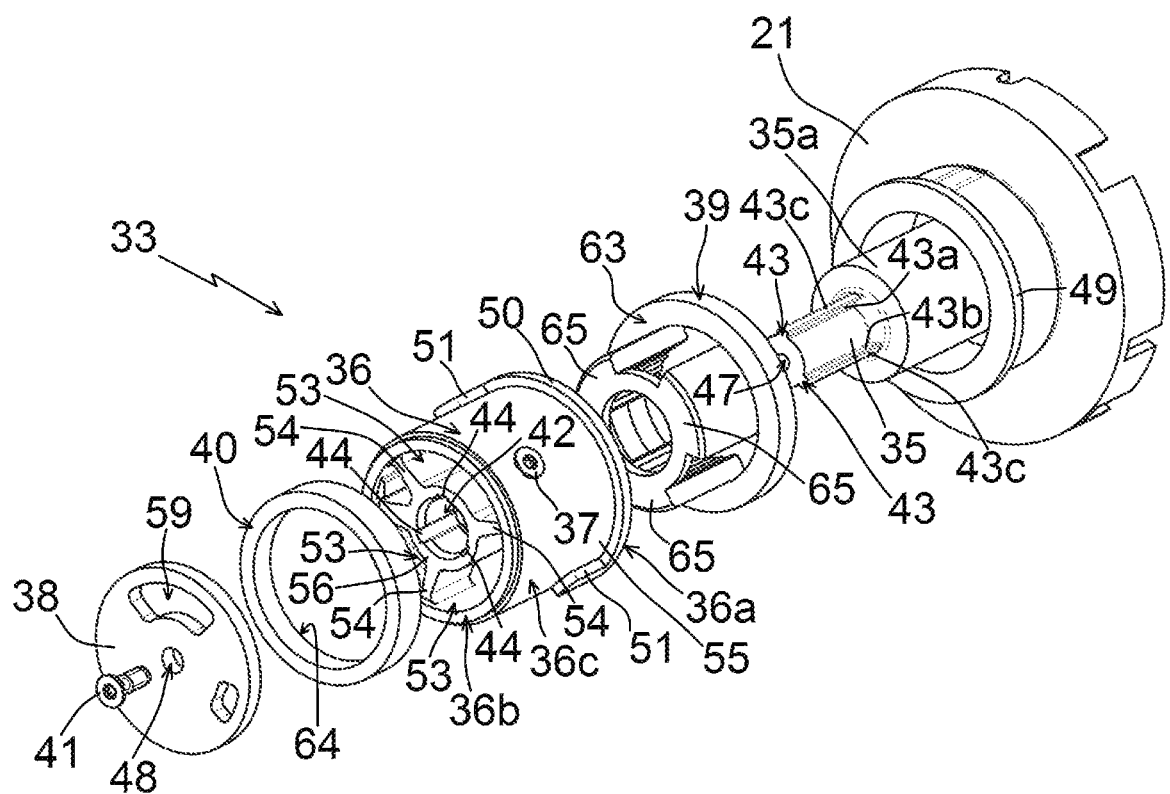
FIG. 11 is a schematic exploded and perspective view of the part of the electromechanical actuator illustrated in FIG. 9.

In a variant, the first and second lateral walls 43a, 43b of each element in relief 43 have a rectilinear shape, according to the direction of the axis of rotation X, as illustrated in FIGS. 6 and 11.

Advantageously, the casing 17 comprises at least a passage hole, not shown, in particular two arranged at an angle of 180° relative to each other, around the axis of rotation X, cooperating, in other words configured to cooperate, with the or one of the first fixing elements 37, in the assembled configuration of the electromechanical actuator 11. Moreover, the transmission element 36 comprises at least a fixing hole 45, in particular two arranged at an angle of 180° relative to each other, around the axis of rotation X, cooperating, in other words configured to cooperate, with the or one of the first fixing elements 37, in the assembled configuration of the electromechanical actuator 11.

Thus, in the assembled configuration of the electromechanical actuator 11, the first fixing elements 37 cooperate, in other words are configured to cooperate, with the passage holes of the casing 17 and the fixing holes 45 of the transmission element 36.

The number and the angular position of the passage holes and of the fixing holes are non-limiting and may be different and, more particularly, are dependent on the number of first fixing elements. The passage holes and the fixing holes may be one or more and, for example, three and arranged at an angle of 120° relative to each other, around the axis of rotation.

Figures 7, 8:
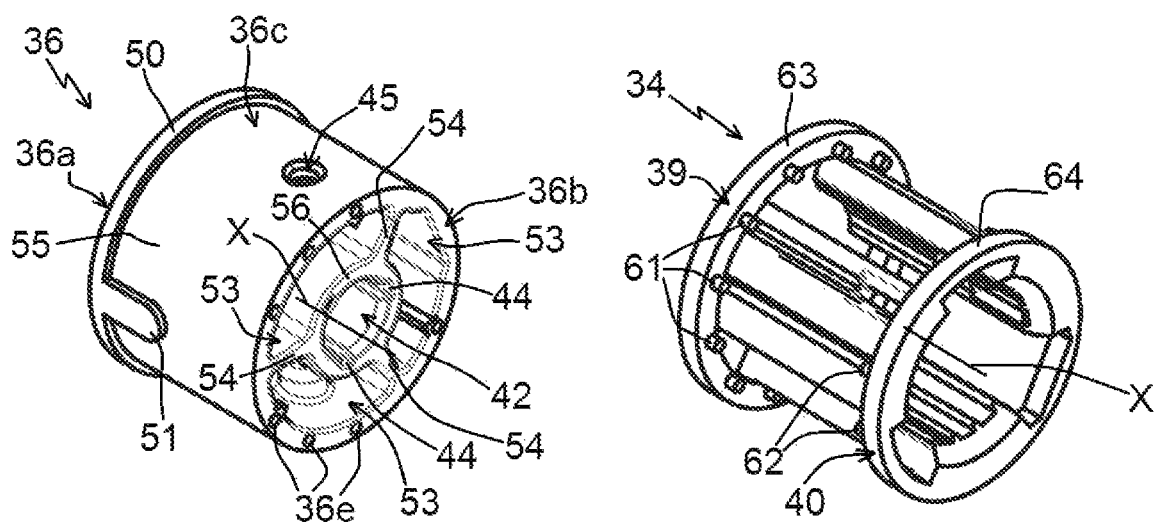
FIG. 7 is a schematic perspective view of a transmission element of the vibration filtering module illustrated in FIGS. 4 to 6.
FIG. 8 is a schematic perspective view of a first and of a second viscoelastic elements forming a vibration filtering member illustrated in FIGS. 4 to 6.
Figure 9:
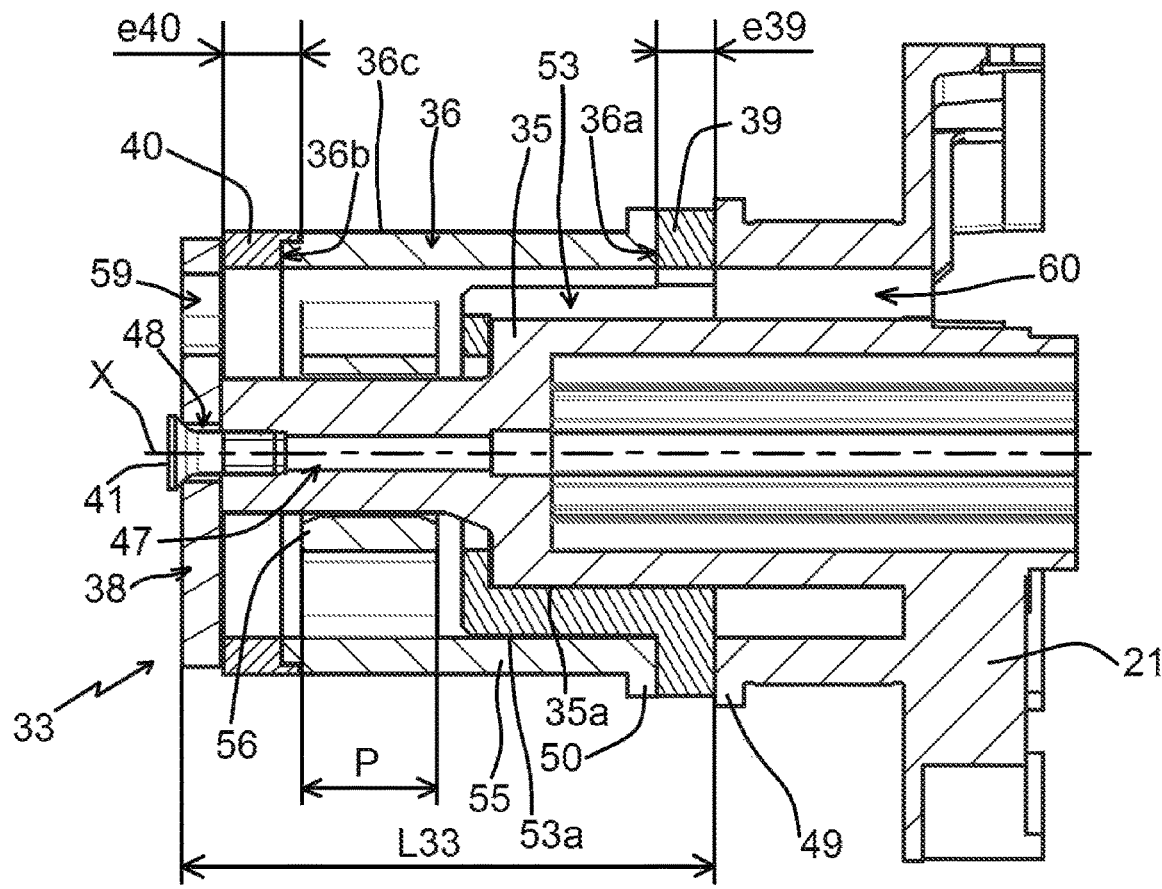
FIG. 9 is a view similar to FIG. 4 illustrating a vibration filtering module according to a second embodiment of the invention.
Figure 10:
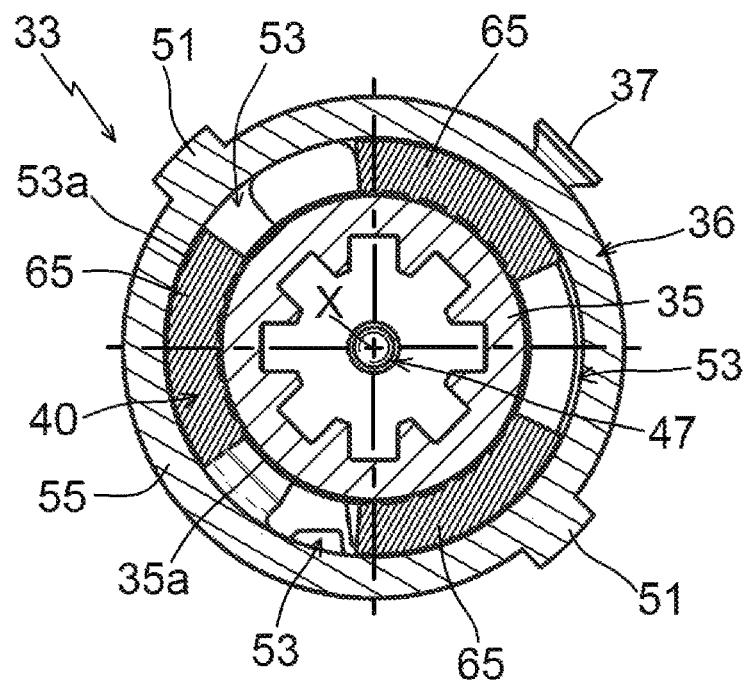
FIG. 10 is a view similar to FIG. 5 illustrating the vibration filtering module according to the second embodiment of the invention.

Advantageously, the transmission element 36 comprises at least an indexing element 51, in particular two indexing elements 51, as illustrated in FIGS. 6 and 7. The or each indexing element 51 of the transmission element 36 cooperates, in other words is configured to cooperate, with a notch 52 arranged in the casing 17, in particular at the first end 17a of the casing 17, in the assembled configuration of the electromechanical actuator 11.

Thus, the transmission element 36 is oriented with respect to the casing 17 of the electromechanical actuator 11, around the axis of rotation X, in the assembled configuration of the electromechanical actuator 11.

Here, the or each indexing element 51 of the transmission element 36 is a stud or a rib.

The number and the angular position of the indexing elements of the transmission element and of the notches of the casing are non-limiting and may be different. The indexing elements and the notches may be one or more and, in particular, three at an angle of 120° relative to each other, around the axis of rotation.

Advantageously, the end stop 38 comprises at least a passage hole 48, in particular one arranged according to the direction of the axis of rotation X and, more particularly, aligned with the axis of rotation X, cooperating, in other words configured to cooperate, with the or one of the second fixing elements 41, in the assembled configuration of the electromechanical actuator 11. Moreover, the shaft 35 of the torque support 21 comprises at least a fixing hole 47, in particular one arranged according to the direction of the axis of rotation X and, more particularly, aligned with the axis of rotation X cooperating, in other words configured to cooperate, with the or one of the second fixing elements 41, in the assembled configuration of the electromechanical actuator 11.

Thus, in the assembled configuration of the electromechanical actuator 11, the second fixing element 41 cooperates, in other words is configured to cooperate, with the passage hole 48 of the end stop 38 and the fixing hole 47 of the shaft 35 of the torque support 21.

The number and the angular position of the passage holes and of the fixing holes are non-limiting and may be different and, more particularly, are dependent on the number of the second fixing elements. The passage holes and the fixing holes may be one or more and, for example, two and arranged according to a direction parallel to the axis of rotation.

Advantageously, the end stop 38 is made in the form of a washer.

Advantageously, in the assembled configuration of the electromechanical actuator 11, the fixing of the transmission element 36 to the shaft 35 of the torque support 21 by means of the first fixing elements 37 is performed at a predetermined distance E from the first end 17a of the casing 17.

Advantageously, the torque support 21 and, more particularly, the shaft 35 of the torque support 21 comprises a shoulder 49. Moreover, in the assembled configuration of the electromechanical actuator 11, the first viscoelastic element 39 bears against the shoulder 49 of the torque support 21.

Thus, the shoulder 49 of the torque support 21 allows to define an end stop for the positioning of the first viscoelastic element 39 and, therefore, of the transmission element 36 with respect to the torque support 21, according to the direction of the axis of rotation X.

Advantageously, the transmission element 36 comprises a shoulder 50. Moreover, in the assembled configuration of the electromechanical actuator 11, the first end 17a of the casing 17 bears against the shoulder 50 of the transmission element 36.

Thus, the shoulder 50 of the transmission element 36 allows to define an end stop for the positioning of the casing 17 with respect to the transmission element 36, according to the direction of the axis of rotation X.

Advantageously, the transmission element 36 comprises at least a second housing 53, in particular three arranged at an angle of 120° relative to each other, around the axis of rotation X.

Advantageously, a part of the first viscoelastic element 39 is arranged, in other words is configured to be arranged, inside the or each second housing 53 of the transmission element 36, in the assembled configuration of the electromechanical actuator 11.

Advantageously, a part of the second viscoelastic element 40 is arranged, in other words is configured to be arranged, inside the or each second housing 53 of the transmission element 36, in the assembled configuration of the electromechanical actuator 11.

Figure 4:
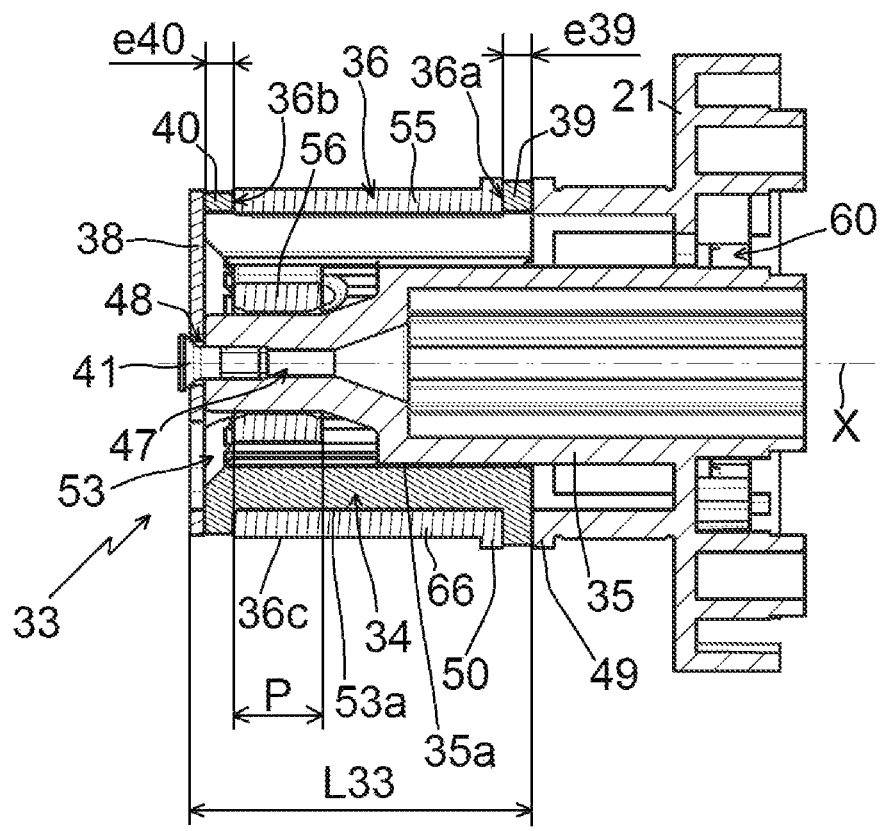
FIG. 4 is a first schematic view in section of a part of the electromechanical actuator illustrated in FIG. 3, illustrating a vibration filtering module according to the first embodiment, according to a plane of section passing through an axis of rotation of the electromechanical actuator.

In this first embodiment, the first viscoelastic element 39 and the second viscoelastic element 40 constitute a vibration filtering member 34 and form a single piece, as illustrated in FIGS. 4 and 8.

Thus, the vibration filtering member 34 is a monobloc component and extends along the axis of rotation X of the electromechanical actuator 11.

Here, the first viscoelastic element 39 and the second viscoelastic element 40 are connected to one another by beams 66, extending along the direction of the axis of rotation X.

The vibration filtering member 34 extends inside the or each second housing 53 of the transmission element 36 and beyond the first and second ends 36a, 36b of the transmission element 36, according to the direction of the axis of rotation X and in the assembled configuration of the electromechanical actuator 11.

Here, the beams 66 of the vibration filtering member 34 extend inside each second housing 53 of the transmission element 36. Moreover, the first and second viscoelastic elements 39, 40 extend beyond the first and second ends 36a, 36b of the transmission element 36.

Figure 5:
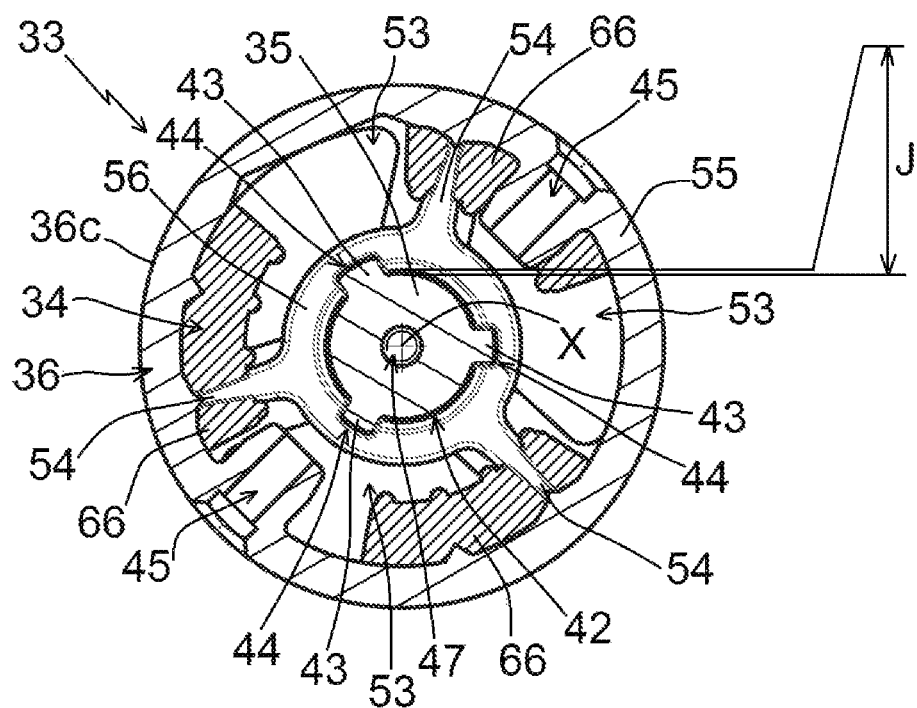
FIG. 5 is a second schematic view in section of the electromechanical actuator illustrated in FIG. 3, illustrating the vibration filtering module according to the first embodiment, according to a plane of section orthogonal to the axis of rotation of the electromechanical actuator.

Here and as illustrated in FIGS. 5 to 7, two adjacent second housings 53 of the transmission element 36 are delimited by an arm 54 of the transmission element 36. Each arm 54 of the transmission element 36 is orthogonal to the axis of rotation X.

Thus, the second housings 53 of the transmission element 36 are delimited by the arms 54 of the transmission element 36 according to the direction of the axis of rotation X.

Advantageously, the arms 54 of the transmission element 36 connect a body 55 of the transmission element 36 to an internal wall 56 of the transmission element 36, in particular of cylindrical shape. The internal wall 56 of the transmission element 36 delimits the first housing 42 of the transmission element 36 according to the direction of the axis of rotation X.

Thus, each second housing 53 of the transmission element 36 corresponds to an opening formed between two adjacent arms 54, the body 55 and the internal wall 56 of the transmission element 36.

Here, the first housing 42 of the transmission element 36 is surrounded by the second housings 53 of the transmission element 36 according to the direction of the axis of rotation X.

Advantageously, the or each second housing 53 of the transmission element 36 allows, in other words is configured to allow, the passage of at least a cable 18, 57, 58, in the assembled configuration of the electromechanical actuator 11.

Advantageously, the end stop 38 comprises at least an opening 59, in particular three arranged at an angle of 120° relative to each other, around the axis of rotation X, for the passage of said at least one cable 18, 57, 58, in the assembled configuration of the electromechanical actuator 11.

Advantageously, the torque support 21 comprises at least an opening 60, in particular one arranged according to the direction of the axis of rotation X, for the passage of said at least one cable 18, 57, 58, in the assembled configuration of the electromechanical actuator 11.

In practice, the cable or cables 18, 57, 58 passing through the opening 60 of the torque support 21, one of the second housings 53 of the transmission element 36 and one of the openings 59 of the end stop 38 may, notably, be the electrical power supply cable 18, a data communication cable 57 or an antenna cable 58.

It may be the antenna cable 58 in the case where the communication module 27 of the electronic control unit 15 is of the wireless type, in particular radioelectric, so that at least a part of the antenna cable 58 is on outside the casing 17, in the assembled configuration of the electromechanical actuator 11.

In the assembled configuration of the electromechanical actuator 11, the cable or cables 18, 57, 58 extend into the casing 17.

Here, the first viscoelastic element 39 and the second viscoelastic element 40 are made by over-molding around the transmission element 36.

Thus, the first and second viscoelastic elements 39, 40 form integral parts of the transmission element 36.

Advantageously, each of the first and second viscoelastic elements 39, 40 comprises pins 61, 62. The transmission element 36 comprises first holes 36*d* at the first end 36*a* of the transmission element 36, in particular at a first end surface of the transmission element 36, and second holes 36*e* at the second end 36*b* of the transmission element 36, in particular at a second end surface of the transmission element 36, the second end surface being opposite to the first end surface. Moreover, in the assembled configuration of the electromechanical actuator 11, the pins 61 of the first viscoelastic element 39 cooperate, in other words are configured to cooperate, with the first holes 36*d* of the transmission element 36 and the pins 62 of the second viscoelastic element 40 cooperate, in other words are configured to cooperate, with the second holes 36*e* of the transmission element 36.

Thus, the insertion of the pins 61, 62 of the first and second viscoelastic elements 39, 40 in the first and second holes 36*d*, 36*e* of the transmission element 36 allows to ensure that the first and second viscoelastic elements 39, 40 are held in position relative to the transmission element 36, in particular during the over-molding of the first and second viscoelastic elements 39, 40 on the transmission element 36.

Advantageously, the pins 61, 62 of the first and second viscoelastic elements 39, 40 and the first and second holes 36*d*, 36*e* of the transmission element 36 extend according to the direction of the axis of rotation X, in the assembled configuration of the electromechanical actuator 11.

Advantageously, the pins 61, 62 are arranged at a wall 63, 64 of each of the first and second viscoelastic elements 39, 40. Moreover, each wall 63, 64 of one of the first and second viscoelastic elements 39, 40 faces the first end 36*a* of the transmission element 36 or the second end 36*b* of the transmission element 36, in the assembled configuration of the electromechanical actuator 11.

Here, the wall 63, 64 of each of the first and second viscoelastic elements 39, 40 forms a shoulder cooperating, in other words configured to cooperate, with the first end 36*a* of the transmission element 36 or with the second end 36*b* of the transmission element 36, in the assembled configuration of the electromechanical actuator 11.

In a second embodiment, illustrated in FIGS. 9 to 12, the elements analogous to those of the first embodiment bear the same references and operate as explained hereabove. In what follows, it is mainly described that what distinguishes this second embodiment from the previous one. In what follows, when a reference sign is used without being reproduced in one of FIGS. 9 to 11, it corresponds to the object bearing the same reference in one of FIGS. 1 to 8 and 12.

The vibration filtering module 33 of the electromechanical actuator 11, illustrated in FIG. 3, according to the second embodiment of the invention is now described, with reference to FIGS. 9 to 12.

Here, the transmission element 36 also comprises at least a second housing 53, in particular three arranged at angle of 120° relative to each other, around the axis of rotation X.

Moreover, the first viscoelastic element 39 and the second viscoelastic element 40 respectively form a distinct piece. At least one of the first and second viscoelastic elements 39, 40 extends partially inside the or each second housing 53 of the transmission element 36 and beyond one of the first and second ends 36*a*, 36*b* of the transmission element 36, according to the direction of the axis of rotation X and in the assembled configuration of the electromechanical actuator 11.

Here, the first viscoelastic element 39 extends partially inside each second housing 53 of the transmission element 36 and beyond the first end 36*a* of the transmission element 36, in other words is held in position inside the body 55 of the transmission element 36 by nesting, in the assembled configuration of the electromechanical actuator 11.

Thus, the first viscoelastic element 39 is held in position with respect to the transmission element 36 through cooperation of shapes.

Advantageously, in the assembled configuration of the electromechanical actuator 11, the wall 63 of the first viscoelastic element 39 bears against the first end 36*a* of the transmission element 36.

Advantageously, in the assembled configuration of the electromechanical actuator 11, the wall 64 of the second viscoelastic element 40 bears against the second end 36b of the transmission element 36.

Advantageously, in the assembled configuration of the electromechanical actuator 11, grooves 65 of the first viscoelastic element 39 are inserted into the second housings 53 of the transmission element 36.

In a variant, not shown, the second viscoelastic element 40 extends partly inside each second housing 53 of the transmission element 36 and beyond the second end 36b of the transmission element 36, in other words is held in position inside the body 55 of the transmission element 36 by nesting, in the assembled configuration of the electromechanical actuator 11.

Furthermore, grooves of the second viscoelastic element 40 are inserted into the second housings 53 of the transmission element 36.

Thanks to the present invention, such a structure for the vibration filtering module is simplified and makes it possible to ensure a reduction in a transmission of vibrations from the electromechanical actuator toward the installation and, more particularly, from the casing of the electromechanical actuator toward the torque support of the electromechanical actuator, while at the same time minimizing the costs of obtaining the vibration filtering module and therefore of the electromechanical actuator.

In this way, such a vibration filtering module is easier to industrialize.

Moreover, the structure of the vibration filtering module makes it possible to obtain an elastic deformation of the first and second viscoelastic elements, in particular by compression, along the axis of rotation, and thus obtain a swiveling between the transmission element and the shaft of the torque support, when the electromechanical actuator is set in operation.

In this way, the vibration filtering module is able to filter vibrations according to an axial direction and a radial direction of the electromechanical actuator, that is to say according to the direction of the axis of rotation and a direction orthogonal to the axis of rotation.

Fixing the transmission element to the casing of the electromechanical actuator makes it possible to ensure to take up the torque between the casing and the torque support.

Furthermore, the structure of the vibration filtering module also makes it possible to minimize the length thereof and thus obtain a vibration filtering module that is compact, so as to minimize the length of the electromechanical actuator.

Of course, numerous modifications can be made to the exemplary embodiments described hereinabove, without departing from the scope of the invention.

In a variant, not shown, the end stop 38 forms an integral part of the shaft 35 of the torque support 21, that is to say made as one piece with the shaft 35. In such a case, the first viscoelastic element 39 and the second viscoelastic element 40 may, for example, be over-molded.

In a variant, not shown, the electromechanical actuator 11 is inserted into a rail, in particular of square or rectangular section, which may be open at one or both ends, in the assembled configuration of the covering device 3. Furthermore, the electromechanical actuator 11 may be configured to drive a driving shaft onto which cords for moving and/or orienting the screen 2 are wound.

Moreover, the embodiments and alternatives envisaged can be combined to generate new embodiments of the invention.

The invention claimed is:

1. An electromechanical actuator for a closure, covering or solar protection installation,
   the electromechanical actuator comprising at least:
   an electric motor,
   a casing, the electric motor being mounted inside the casing, in an assembled configuration of the electromechanical actuator,
   a torque support, the torque support being arranged at a first end of the casing of the electromechanical actuator, in the assembled configuration of the electromechanical actuator, the torque support comprising a shaft, the shaft extending along an axis of rotation of the electromechanical actuator,
   a vibration filtering module, the vibration filtering module being arranged inside the casing of the electromechanical actuator, in the assembled configuration of the electromechanical actuator,
   wherein the vibration filtering module comprises at least:
   an end stop, the end stop being connected to the shaft of the torque support,
   a transmission element, the transmission element being mounted around the shaft of the torque support and being fixed to the casing using at least a first fixing element, in the assembled configuration of the electromechanical actuator, the transmission element extending between the torque support and the end stop along a direction of the axis of rotation, the transmission element having a first end and a second end, the second end being opposite to the first end along the direction of the axis of rotation,
   a first viscoelastic element, the first viscoelastic element being arranged between the torque support and the first end of the transmission element, along the direction of the axis of rotation and in the assembled configuration of the electromechanical actuator, the first viscoelastic element being adapted to be compressed along the direction of the axis of rotation between the torque support and the first end of the transmission element, and
   a second viscoelastic element, the second viscoelastic element being arranged between the second end of the transmission element and the end stop along the direction of the axis of rotation and in the assembled configuration of the electromechanical actuator, the second viscoelastic element being adapted to be compressed along the direction of the axis of rotation between the second end of the transmission element and the end stop.

2. The electromechanical actuator for a closure, covering or solar protection installation according to claim 1,
   wherein the transmission element comprises a first housing, and
   wherein the shaft of the torque support is configured to be arranged inside the first housing of the transmission element, in the assembled configuration of the electromechanical actuator.

3. The electromechanical actuator for a closure, covering or solar protection installation according to claim 2,
   wherein the shaft of the torque support comprises at least an element in relief,
   wherein the transmission element comprises at least a recessed element extending away from the axis of rotation from an internal surface of the first housing, and
   wherein the or one of the elements in relief of the shaft of the torque support is configured to cooperate with the or one of the recessed elements of the transmission element, in the assembled configuration of the electromechanical actuator, or vice versa.

4. The electromechanical actuator for a closure, covering or solar protection installation according to claim 1,
wherein the transmission element comprises at least a second housing, and
wherein the first viscoelastic element and the second viscoelastic element constitute a vibration filtering member and form a single piece, the vibration filtering member extending inside the second housing of the transmission element and beyond the first and second ends of the transmission element along the direction of the axis of rotation and in the assembled configuration of the electromechanical actuator.

5. The electromechanical actuator for a closure, covering or solar protection installation according to claim 1,
wherein the transmission element comprises at least a second housing, and
wherein the first viscoelastic element and the second viscoelastic element respectively form a distinct piece, at least one of the first and second viscoelastic elements extending partially inside the second housing of the transmission element and beyond one of the first and second ends of the transmission element along the direction of the axis of rotation and in the assembled configuration of the electromechanical actuator.

6. The electromechanical actuator for a closure, covering or solar protection installation according to claim 1, wherein the end stop is fixed to the shaft of the torque support using at least a second fixing element, in the assembled configuration of the electromechanical actuator.

7. The electromechanical actuator for a closure, covering or solar protection installation according to claim 6, wherein the end stop is made in the form of a washer.

8. The electromechanical actuator for a closure, covering or solar protection installation according to claim 1, wherein the end stop forms an integral part of the shaft of the torque support.

9. The electromechanical actuator for a closure, covering or solar protection installation according to claim 1, wherein the electromechanical actuator comprises at least a battery, the battery being arranged inside the casing, in the assembled configuration of the electromechanical actuator.

10. A closure, covering or solar protection installation comprising a screen, a winding tube and an electromechanical actuator according to claim 1, wherein the screen is arranged so as to be able to be wound onto the winding tube and the winding tube is arranged so as to be rotationally driven by the electromechanical actuator.

11. The electromechanical actuator for a closure, covering or solar protection installation according to claim 2,
wherein the transmission element comprises at least a second housing, and
wherein the first viscoelastic element and the second viscoelastic element constitute a vibration filtering member and form a single piece, the vibration filtering member extending inside the second housing of the transmission element and beyond the first and second ends of the transmission element along the direction of the axis of rotation and in the assembled configuration of the electromechanical actuator.

12. The electromechanical actuator for a closure, covering or solar protection installation according to claim 3,
wherein the transmission element comprises at least a second housing, and
wherein the first viscoelastic element and the second viscoelastic element respectively form a distinct piece, at least one of the first and second viscoelastic elements extending partially inside the second housing of the transmission element and beyond one of the first and second ends of the transmission element along the direction of the axis of rotation and in the assembled configuration of the electromechanical actuator.

13. The electromechanical actuator for a closure, covering or solar protection installation according to claim 2, wherein the end stop is fixed to the shaft of the torque support using at least a second fixing element, in the assembled configuration of the electromechanical actuator.

14. The electromechanical actuator for a closure, covering or solar protection installation according to claim 13, wherein the end stop is made in the form of a washer.

15. The electromechanical actuator for a closure, covering or solar protection installation according to claim 3, wherein the end stop is fixed to the shaft of the torque support using at least a second fixing element, in the assembled configuration of the electromechanical actuator.

16. The electromechanical actuator for a closure, covering or solar protection installation according to claim 15, wherein the end stop is made in the form of a washer.

17. The electromechanical actuator for a closure, covering or solar protection installation according to claim 4, wherein the end stop is fixed to the shaft of the torque support using at least a second fixing element, in the assembled configuration of the electromechanical actuator.

18. An electromechanical actuator for a closure, covering or solar protection installation,
the electromechanical actuator comprising at least:
an electric motor,
a casing, the electric motor being mounted inside the casing, in an assembled configuration of the electromechanical actuator,
a torque support, the torque support being arranged at a first end of the casing of the electromechanical actuator, in the assembled configuration of the electromechanical actuator, the torque support comprising a shaft, the shaft extending along an axis of rotation of the electromechanical actuator,
a vibration filtering module, the vibration filtering module being arranged inside the casing of the electromechanical actuator, in the assembled configuration of the electromechanical actuator,
wherein the vibration filtering module comprises at least:
a transmission element, the transmission element being mounted around the shaft of the torque support and being fixed to the casing using at least a first fixing element, in the assembled configuration of the electromechanical actuator,
an end stop, the end stop being connected to the shaft of the torque support,
a first viscoelastic element, the first viscoelastic element being arranged between the torque support and a first end of the transmission element along a direction of the axis of rotation and in the assembled configuration of the electromechanical actuator, and
a second viscoelastic element, the second viscoelastic element being arranged between a second end of the transmission element and the end stop along the direction of the axis of rotation and in the assembled configuration of the electromechanical actuator, the second end of the transmission element being opposite to the first end of the transmission element, wherein the transmission element comprises a first housing, and wherein the shaft of the torque support is configured to be arranged inside the first housing of the transmission element, in the assembled configuration of the electromechanical actuator, wherein the shaft of the torque support comprises at least an element in relief, wherein the transmission element comprises at least a recessed element extending away from the axis of rotation from an internal surface of the first housing, and wherein the or one of the elements in relief of the shaft of the torque support is configured to cooperate with the or one of the recessed elements of the transmission element, in the assembled configuration of the electromechanical actuator, or vice versa.

19. An electromechanical actuator for a closure, covering or solar protection installation, the electromechanical actuator comprising at least:
an electric motor,
a casing, the electric motor being mounted inside the casing, in an assembled configuration of the electromechanical actuator,
a torque support, the torque support being arranged at a first end of the casing of the electromechanical actuator, in the assembled configuration of the electromechanical actuator, the torque support comprising a shaft, the shaft extending along an axis of rotation of the electromechanical actuator,
a vibration filtering module, the vibration filtering module being arranged inside the casing of the electromechanical actuator, in the assembled configuration of the electromechanical actuator, wherein the vibration filtering module comprises at least:
a transmission element, the transmission element being mounted around the shaft of the torque support and being fixed to the casing using at least a first fixing element, in the assembled configuration of the electromechanical actuator,
an end stop, the end stop being connected to the shaft of the torque support,
a first viscoelastic element, the first viscoelastic element being arranged between the torque support and a first end of the transmission element along a direction of the axis of rotation and in the assembled configuration of the electromechanical actuator, and
a second viscoelastic element, the second viscoelastic element being arranged between a second end of the transmission element and the end stop along the direction of the axis of rotation and in the assembled configuration of the electromechanical actuator, the second end of the transmission element being opposite to the first end of the transmission element, wherein the transmission element comprises at least a second housing, and wherein the first viscoelastic element and the second viscoelastic element constitute a vibration filtering member and form a single piece, the vibration filtering member extending inside the second housing of the transmission element and beyond the first and second ends of the transmission element, along the direction of the axis of rotation and in the assembled configuration of the electromechanical actuator.

20. An electromechanical actuator for a closure, covering or solar protection installation, the electromechanical actuator comprising at least:
an electric motor,
a casing, the electric motor being mounted inside the casing, in an assembled configuration of the electromechanical actuator,
a torque support, the torque support being arranged at a first end of the casing of the electromechanical actuator, in the assembled configuration of the electromechanical actuator, the torque support comprising a shaft, the shaft extending along an axis of rotation of the electromechanical actuator,
a vibration filtering module, the vibration filtering module being arranged inside the casing of the electromechanical actuator, in the assembled configuration of the electromechanical actuator, wherein the vibration filtering module comprises at least:
a transmission element, the transmission element being mounted around the shaft of the torque support and being fixed to the casing using at least a first fixing element, in the assembled configuration of the electromechanical actuator,
an end stop, the end stop being connected to the shaft of the torque support,
a first viscoelastic element, the first viscoelastic element being arranged between the torque support and a first end of the transmission element along a direction of the axis of rotation and in the assembled configuration of the electromechanical actuator, and
a second viscoelastic element, the second viscoelastic element being arranged between a second end of the transmission element and the end stop along the direction of the axis of rotation and in the assembled configuration of the electromechanical actuator, the second end of the transmission element being opposite to the first end of the transmission element, wherein the transmission element comprises at least a second housing, and wherein the first viscoelastic element and the second viscoelastic element respectively form a distinct piece, at least one of the first and second viscoelastic elements extending partially inside the second housing of the transmission element and beyond one of the first and second ends of the transmission element, along the direction of the axis of rotation and in the assembled configuration of the electromechanical actuator.

* * * * *